Figure 5:
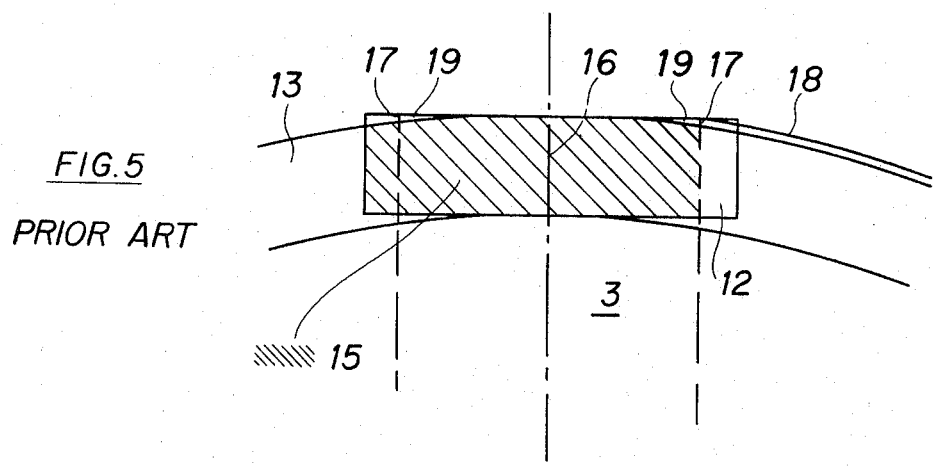

United States Patent [19]
Nyffeler et al.

[11] 3,867,869
[45] Feb. 25, 1975

[54] STATIONARY GUIDE BLADE STRUCTURE FOR AXIAL-FLOW TYPE TURBO-MACHINE

[75] Inventors: Ernst Nyffeler, Wettingen; Peter Pfenicher, Gebenstorf, both of Switzerland

[73] Assignee: BBC Brown, Boveri & Co., Baden, Switzerland

[22] Filed: Aug. 1, 1973

[21] Appl. No.: 384,509

[30] Foreign Application Priority Data
Aug. 16, 1972   Switzerland...................... 12118/72

[52] U.S. Cl. ............................ 90/11 C, 415/217
[51] Int. Cl. ...................... B23c 3/00, F01d 25/24
[58] Field of Search ............ 415/217; 416/217, 215, 416/218; 90/11 C

[56] References Cited
UNITED STATES PATENTS
| | | | |
|---|---|---|---|
| 1,156,529 | 10/1915 | Hillner | 416/215 |
| 1,475,212 | 11/1973 | Warren et al. | 415/217 |
| 2,295,012 | 9/1942 | Semar | 416/215 |

FOREIGN PATENTS OR APPLICATIONS
| | | | |
|---|---|---|---|
| 613,667 | 12/1948 | Great Britain | 416/217 |

Primary Examiner—William L. Freeh
Assistant Examiner—Louis J. Casaregola
Attorney, Agent, or Firm—Pierce, Scheffler & Parker

[57] ABSTRACT

A stationary guide blade structure for installation in the guide blade carrier of a turbo-machine in which one lateral surface of the root portion of the blade lies in a meridional plane and includes an arc-shaped slot by means of which the root portion is fixed in the carrier. The radially outer flank of the slot forms part of the surface of a frustum the axis of which coincides with the axis of the rotor component of the turbo-machine, thus to enable the slot to be machined with a combined side-milling and angle cutter.

1 Claim, 6 Drawing Figures

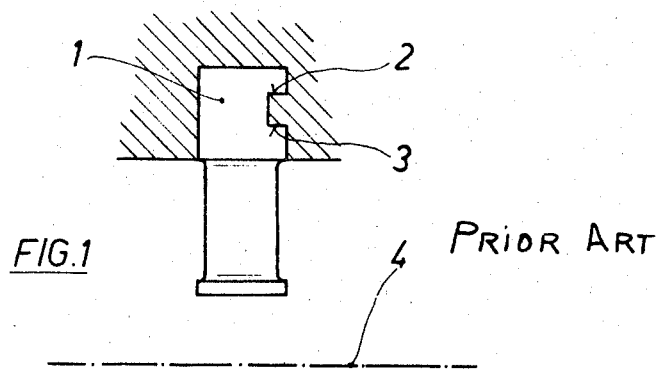
FIG.1  PRIOR ART
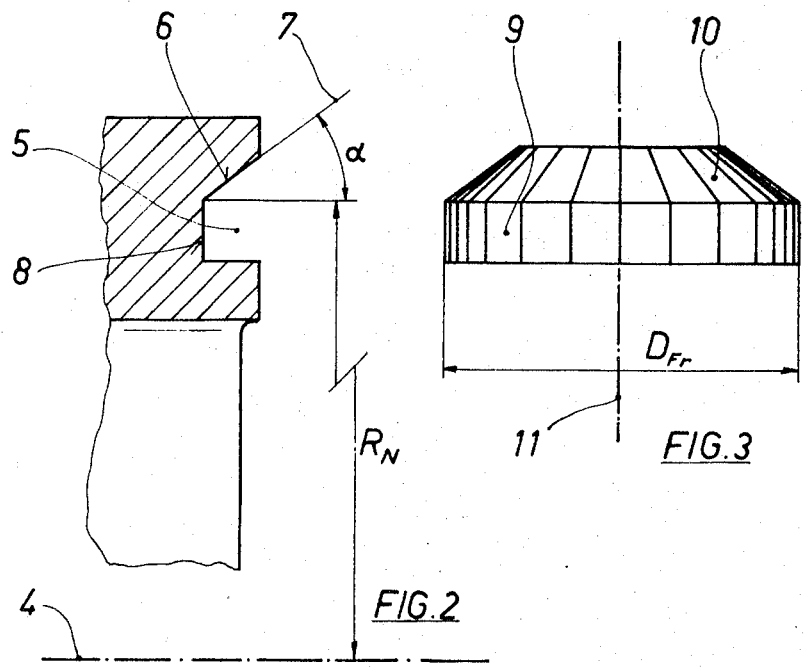
FIG.2
FIG.3

STATIONARY GUIDE BLADE STRUCTURE FOR AXIAL-FLOW TYPE TURBO-MACHINE

The invention concerns an improved mode for producing a stationary guide blade for an axial-flow turbomachine, one lateral surface of the blade root lying in a meridional plane having machined in it an arc-shaped slot by means of which the root portion of the blade is fixed in the blade carrier.

Guide blades 1 of this kind have hitherto been made with slot flanks 2, 3, see FIG. 1, which form a part of a cylindrical surface, the axis of which coincides with the rotor axis 4. A side-milling cutter cannot be used to make such a slot of which the axis of rotation lies parallel to the rotor axis, because the diameter of the cutting tool would be much too small, owing to the narrow width of the slot. It is also not possible to use a side-milling cutter which has its axis of rotation perpendicular to the rotor axis, because the outer flank 2 of the slot in FIG. 1 would be undercut. Thus, apart from employing a vertical boring machine, the only remaining possibility is to machine the slot with an end-milling cutter, but this by its very nature is of small diameter, so that the feed rate can only be low, resulting long machining times. Furthermore, the blade-fixing method used in many machines does not permit the use of an end-milling cutter.

The principal object of the present invention is to form the slot in a guide blade of the kind described in such a way that it can be produced with a side-milling cutter.

This objective is achieved in that a radially outer flank of the slot forms a part of the surface of a frustum, the axis of which coincides with the rotor axis and the minimum angle of inclination $\alpha$ between the corresponding generatrix and the rotor axis complies with the formula $$\tan \alpha = D_{Fr}/2R_N$$

where $D_{Fr}$ is the diameter of the side-milling cutter used to machine the slot, and $R_N$ is the radial distance from the rotor axis to the point of juncture between the outer flank and the base of the slot.

An arcuate slot of this shape allows the use of a side-milling cutter combined with an angle cutter, the cylindrical part of the cutter tool machining the slot down to its base, while the conical portion of the tool gives the outer flank of the slot the shape of a frustum. The geometrical relationships can be derived from the formula given. The angle of inclination between a generatrix of the frustum and the rotor axis can be made smaller in proportion as the diameter of the cutter is smaller, or the distance between the slot and the rotor axis is greater. Compared with method of machining used hitherto, the working time is shorter and the production costs are reduced.

In addition to the FIG. 1 already mentioned, the drawing also shows an example of the invention, wherein FIG. 2 shows an axial section through a base part of stationary guide blade, and FIG. 3 shows the corresponding cutting tool.

Figure 6:
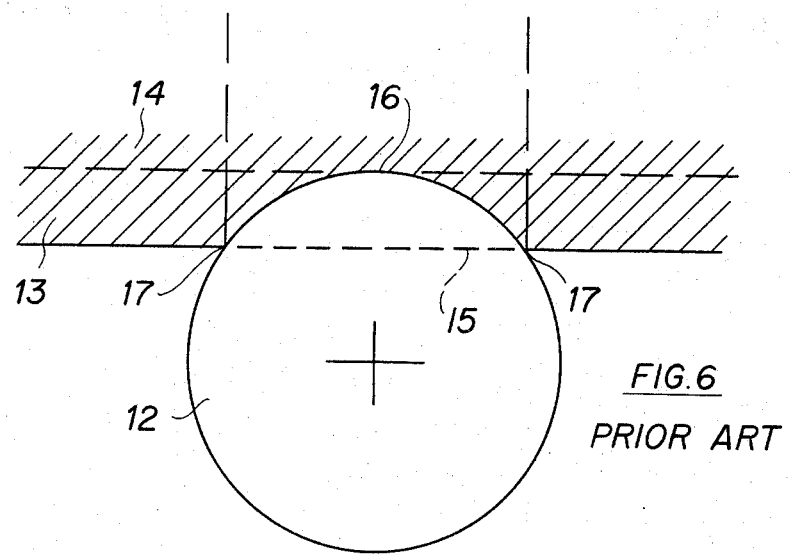
Figure 4:
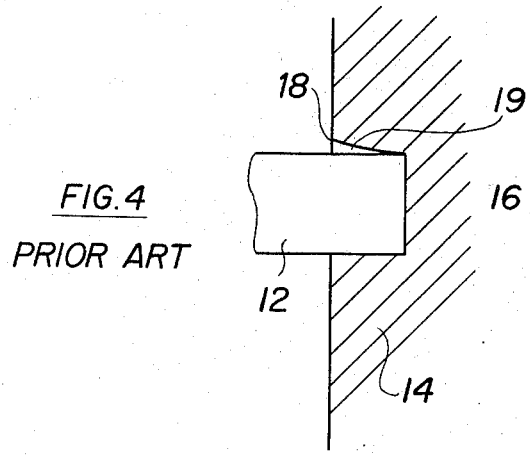

FIGS. 4–6 illustrate the undercutting which results from machining a slot at an $\alpha$ value below the minimum value established by applicant's invention.

In FIG. 2 a lateral surface of the blade 1 has machined in it an arcuate slot 5, the outer flank 6 of which forms part of the surface of a frustum. The generatrix 7 of this frustum surface and the rotor axis 4, or a line parallel to it, encloses an angle of inclination $\alpha$, the minimum value of which is dependent on the diameter $D_{Fr}$ of the side-milling cutter machining the slot 5 and on the radial distance $R_N$ of the rotor axis 4 from the point of juncture between the flank 6 and the base 8 of the slot, according to the formula $$\tan \alpha = D_{Fr}/2R_N$$

which can be determined from the geometrical relationships. The angle $\alpha$ can also be made greater than calculated by this formula, but the machining work required will then be greater. It must not be smaller because under-cutting will then occur.

FIG. 3 shows the cutter used in making the slot of FIG. 2. It consists of a combination of a side-milling cutter 9 and an angle cutter 10, its diameter is denoted $D_{Fr}$ and when machining the slot 5, cutters 9 and 10 rotate about axis 11, which is itself turning in a plane perpendicular to rotor axis 4.

FIGS. 4–6 illustrate the undercutting which takes place if the blade slot is machined at some value of $\alpha$ smaller than the minimum value established by the above stated function. The cutter 12 is set to machine the groove 13 from the work piece 14. The hatched area 15 is that sectional area of the cutter up to which it penetrates the groove. Due to the curved shape of the groove the cutter will machine the desired precise width of the groove only at the line 16, the hindmost groove part, this width being equal to the hight of the side-milling cutter. On all other points the surface of the cutter will remove material from the provided for upper contact area of the groove, especially at the corners 17 of the area 15. Consequently, the upper contact area of the groove will not have a cylindrical, but a curved shape (see sectional view of FIG. 4) and recess 18 is thus formed. The black areas 19 represent the material that has been cut away in excess.

If one visualizes the cutter as rotating, but not turning about the axis of the groove as is necessary for its manufacture, it will machine from the desired upper contact area of the groove a segment of a circle, its boundary being an arc of a circle, cut off at the area 15. If this arc of a circle is transferred by a cylindrical projection with respect to the groove axis, to axial plane placed through 16, the shape shown by FIG. 4 will result. The same figure will result, if the cutter continues to operate when traversing about the groove axis.

We claim:

1. The method of machining an arcuate slot into a lateral surface of the root portion of a stationary guide blade lying in a meridional plane for installation in a complementary circumferentially extending slot provided in the blade carrier of a turbo-machine of the axial flow type and wherein said root slot includes a radially inner flank forming part of a cylindrical surface concentric with the axis of the rotor component of the turbo-machine and a radially outer inclined flank forming the inclined surface part of a frustum and which has an optimum minimum allowable angle of inclination $\alpha$ between the corresponding generatrix of the frustum and the rotor axis in order to avoid under-cutting, said method being carried out by a combined side and angle milling cutter wherein $D_{Fr}/2$ represents the radius of the side-milling surface of the cutter which machines the base and radially inner flank of said root slot, $R_N$ represents the radial distance from the axis of the rotor to the junction between the outer inclined flank machined by the angle-milling surface of said cutter and the base of said root slot, and wherein the said optimum minimum angle of inclination $\alpha$ of said outer inclined flank complies with the formula $$\operatorname{Tan} \alpha = D_{Fr}/2R_N$$

* * * * *